Jan. 20, 1942. R. G. BIRR 2,270,250
SWINGING ARM SUPPORT
Filed Sept. 12, 1940 2 Sheets-Sheet 1
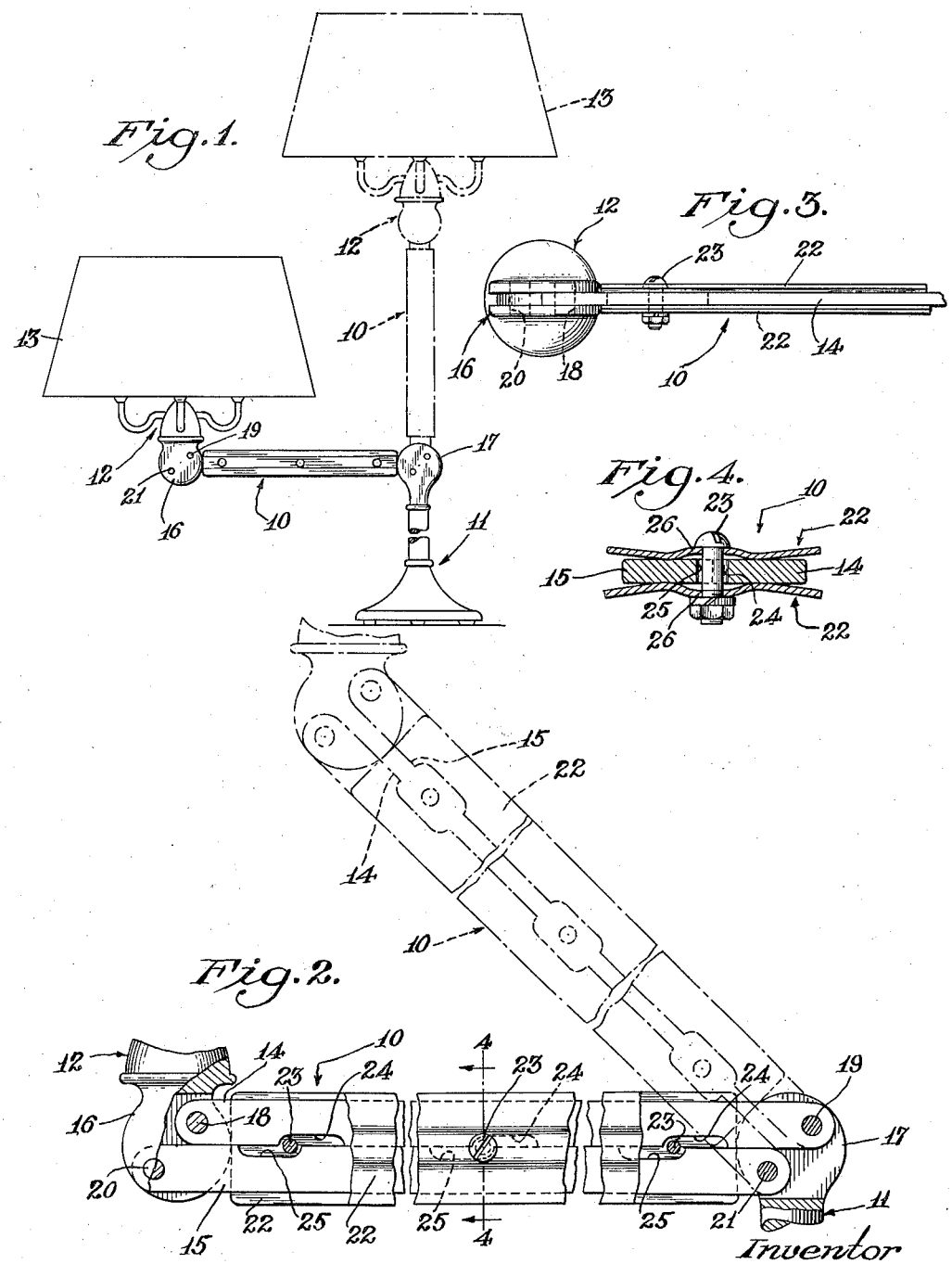
Inventor
Rudolph G. Birr
By Parker, Carlson, Pitzner & Hubbard
Attorneys.

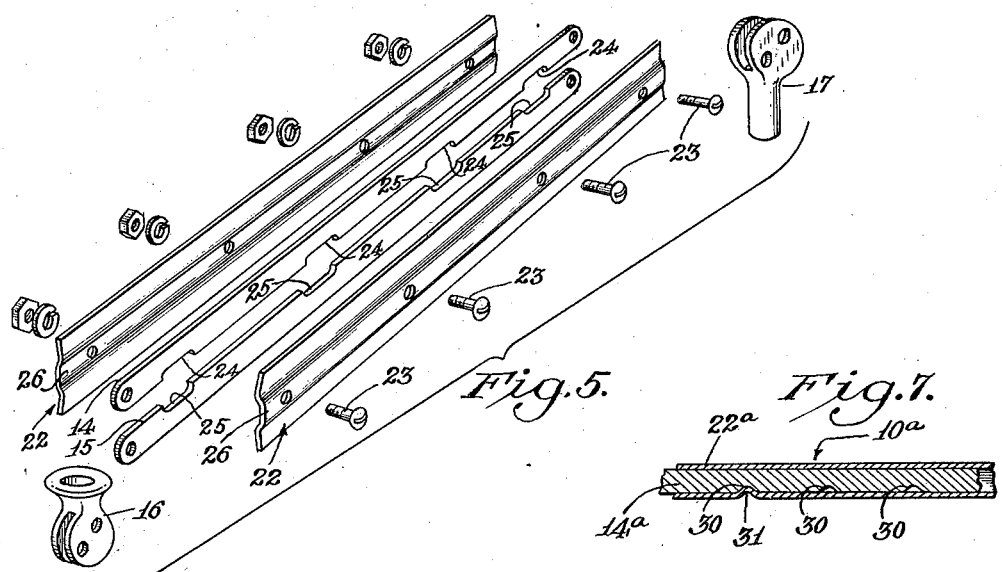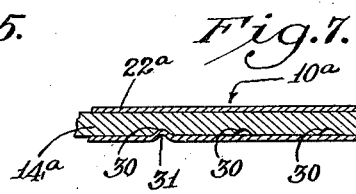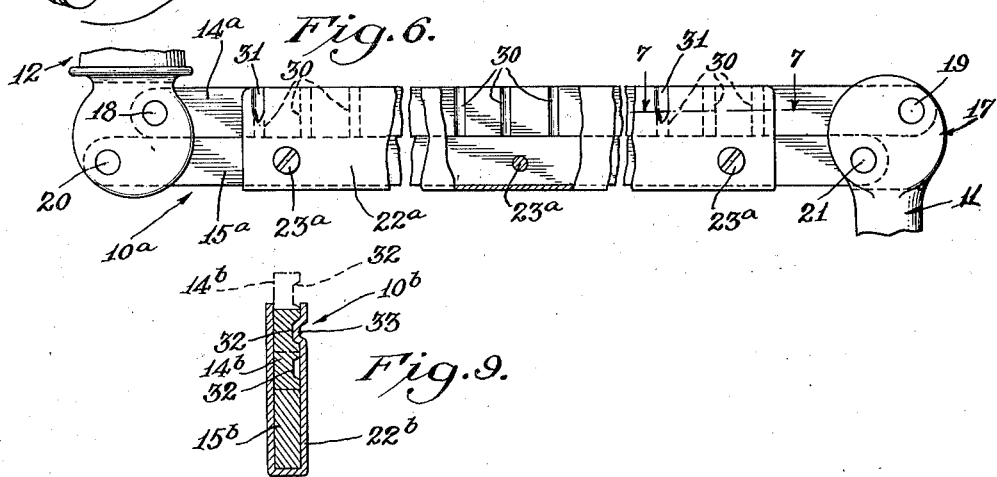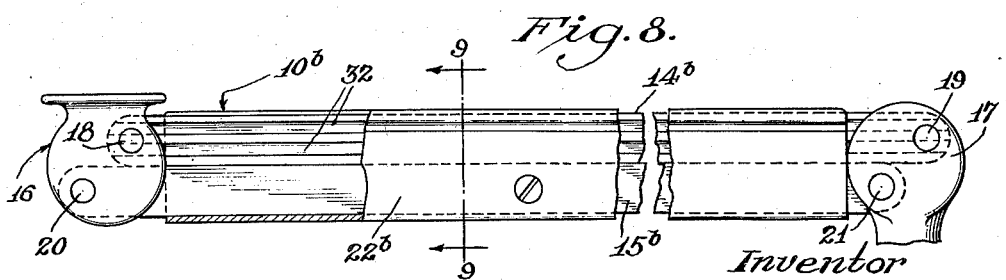

Patented Jan. 20, 1942

2,270,250

UNITED STATES PATENT OFFICE 2,270,250

SWINGING ARM SUPPORT

Rudolph G. Birr, Lombard, Ill., assignor to Precision Metal Workers, Chicago, Ill., a corporation of Illinois Application September 12, 1940, Serial No. 356,414

8 Claims. (Cl. 248—281)

The invention relates to improvements in supports of the so-called swinging or folding arm type. Such supports may be used for a wide variety of purposes, as for example, for holding reading lamps, spotlights, instrument trays and almost any number of other devices.

One important object of the present invention is to provide a sturdy support of the type described, which is especially adapted for low-cost quantity production.

Another object is to provide a support of the type indicated which can be swung with freedom through a wide arc of adjustment and which embodies a novel and simple arrangement for effectually holding it in a selected position of adjustment.

Further objects and advantages of the invention will become apparent as the following description proceeds taken in connection with the accompanying drawings, in which:

Figure 1 is a side elevation of a lamp stand comprising a swinging arm embodying my invention, the arm being shown in full lines at one extremity of its adjusting movement and in dot-dash lines at the other extremity of such movement.

Fig. 2 is an enlarged fragmentary detail side view of the swinging arm.

Fig. 3 is a lower edge view of the left hand portion of the arm.

Fig. 4 is a transverse sectional view taken along the line 4—4 in Fig. 2.

Fig. 5 is an exploded perspective view of the swinging arm.

Fig. 6 is a side elevation, partially broken, of a modified form of swinging arm embodying the invention.

Fig. 7 is an enlarged detail sectional view taken along the line 7—7 in Fig. 6.

Fig. 8 is a side elevation, with portions of the parts broken away, of a second modified form of swinging arm embodying the invention.

Fig. 9 is an enlarged detail transverse sectional view taken substantially along the line 9—9 in Fig. 8.

Though but three particular embodiments of the invention have been described and shown herein, it will be apparent to those skilled in the art that a number of other modifications and alternative arrangements may be used without departing from the invention. Consequently, the detailed description herein of the particular specific embodiments shown is not intended to be limiting in character, but, on the other hand, I intend to cover all modifications and alternative constructions falling within the spirit and scope of the invention as expressed in the appended claims.

In the first exemplary embodiment, my invention has been shown (Fig. 1) as applied to a support for an electric lamp. The support shown comprises a swinging arm mechanism 10 embodying my invention, mounted on a suitable standard 11 and carrying on its free or outer end a lamp base 12 with the usual shade 13. The arm can be adjustably positioned either horizontally, as shown in full lines, vertically as shown in dot-dash lines, or in any desired intermediate position. It will be appreciated that a suitable decorative sleeve or the like, not shown, may be telescoped over the arm 10 to conceal it when occasion requires.

The arm 10 comprises a linkage of what is commonly known as the parallelogram type. It includes two long links 14, 15 in the form of rigid metal bars presenting flat side faces (Figs. 2 to 5). These links are disposed in parallel edge to edge relation, and, in the course of swinging movement of the arm, shift relative to each other in a longitudinal direction. At their opposite ends the links are cross-linked together to complete the parallelogram linkage. In the present instance the cross linkage is formed by two metal yokes 16, 17 having disk shaped jaws between which the links are pivoted at 18, 19 and 20, 21 respectively (Fig. 2). The yoke 17 at the inner end of the arm may be rigidly fastened to the standard 11, while the other yoke 16 is rigidly fastened to the lamp base 12.

Upon reference to Fig. 2 it will be observed that in the operation of the parallelogram linkage, when the arm 10 is in its horizontal position, the lowermost link 15 is displaced longitudinally outward with respect to the upper link 14. On the other hand, when the linkage is swung to upright position this relation is reversed so that the link 14 is now displaced longitudinally upward from the other link 15. At their 45° angle position (shown in dot-dash lines in Fig. 2), or in other words, midway between vertical and horizontal, the two links 14, 15 are exactly matched as to endwise position. It is to be observed also that when the arm 10 is either in its horizontal or vertical position, the links go solid against each other edge to edge, thereby positively limiting the range of arm movement and that they have their maximum lateral displacement relative to each other when the arm 10 is in its midway position.

In order to hold the arm 10 in any selected position of angular adjustment intermediate its extreme vertical end horizontal positions or in such extreme positions, a novel frictional type gripping means has been provided for the links. Upon reference to Figs. 2 to 5 it will be seen that this means comprises two rectangular gripper plates or portions 22 of resilient sheet metal arranged to overlie opposite flat faces of the pair of links 14, 15. The sheet metal plates 22 are of a width sufficient completely to embrace the links even when the latter are spread apart a maximum distance, this latter point occurring when the arm is in its 45° or midway position of adjustment (see dot-dash line position of Fig. 2).

To draw the sheet metal gripper plates 22 snugly against the flat faces of the pair of links 14, 15 a series of bolts 23 are used. These bolts pass through complemental elongated notches 24, 25 in the opposed edges of the links 14 and 15, respectively (Figs. 2 and 5). The notches are of such length that when the linkage is in its horizontal position the shanks of the bolts 23 are received between the overlapping right hand ends of the notches 25 in the lower link 15 and left hand ends of the notches 24 of the upper link 14. Conversely, when the linkage is in its upright position the shanks of the bolts 23 are received between the overlapping opposite ends of the notches 24, 25. Preferably the gripper plates 22 are bowed outwardly slightly along their longitudinal center lines (see Figs. 4 and 5) as indicated at 26, and are bowed toward each other along longitudinal lines lying on each side of their centers. In this way a firm frictional grip on each of the links 14, 15 is assured in any position of angular adjustment for the arm 10. This frictional grip of the plates 22 on the links 14, 15 yieldably resists of motion of the latter relative to each other both laterally and longitudinally. The bolts 23 are drawn up tight enough so that any expected load carried by the arm will not cause the latter to swing inadvertently, though leaving the linkage free enough that it can be pulled into a desired position by a user.

Those familiar with metal work will appreciate at once the simplicity of the manufacturing operations required in making the parts for the swinging arm described above. The bolts 23 are, of course, standard screw machine parts, while the gripper plates 22 can be fashioned as metal stampings, the links 14, 15 cut from ordinary bar stock and the yokes 16, 17 made as simple castings. Despite this extreme simplicity and low cost very effective operation is achieved as well as a thoroughly sturdy construction. In connection with the operation observe particularly that the frictional grip of the resilient sheet metal plates 22 throughout substantially the entire length of the links 14, 15 insures that the links will be properly held against relative displacement in any particular angle of adjustment and yet the arm 10 can be swung, without the application of too excessive a force, to move the linkage.

In Figs. 6 and 7 I have illustrated a modified form of the swinging arm support 10ª, which may be used in substantially the same manner as the arm 10 described above. The arm 10ª resembles the arm 10 in that it also comprises a parallelogram type of linkage including two elongated links 14ª, 15ª made of flat bar stock arranged edge to edge to present flat side faces and pivoted at their ends on yokes 16, 17 identical with those described above, like reference numerals having been used for like parts. In the present instance, however, releasable retention of the linkage in various positions of angular adjustment is accomplished by means of a single piece of sheet metal 22ª folded upon itself to form the two opposed portions overlying the opposite side faces of the links 14ª, 15ª and resiliently gripping the link 14ª. Three screws 23ª fix the folded metal sheet 22ª to the other link 15ª.

In order to define predetermined angular adjustment positions with particularity for the arm 10ª, transverse grooves 30 are formed in the link 14ª and complemental ribs 31 are stamped in the opposed or overlapping portion of the sheet metal gripper plate 22ª to ride into these grooves. Three such sets of grooves 30 have been shown (Fig. 6) on one side of the link 14ª with three grooves in each set and a cooperating rib for each set in the plate 22ª. The ribs 31 enter into the corresponding one of the cooperating end grooves 30 in the associated set when the arm 10ª is in its respective two extreme positions, which are 90° apart, and into the center groove of the associated set when the arm is in its halfway or 45° position. Of course, notches corresponding to other positions can be provided if desired. This rib and groove arrangement affords distinct and precise locating of the swinging arm 10ª in the corresponding angular position. As the arm is swung between these positions the ribs 31 rub frictionally on the link 14ª, however, so that the linkage is also releasably retained in any desired intermediate position in which it may be left. At all times the unribbed portion or jaw of the gripper plate 22ª engages the link 14ª frictionally throughout substantially the entire length of the latter, thereby yieldably resisting linkage movement.

In Figs. 8 and 9 I have shown still another modified form of swinging arm 10ᵇ also embodying my invention. This arm 10ᵇ is substantially like the arm 10ª described above except that the positions of adjustment are defined by longitudinal rather than transverse ribs and grooves on the opposed portions of the sliding parts. Thus the linkage again comprises bar links 14ᵇ, 15ᵇ pivoted to yokes 16, 17 and, as in the case of the arm 10ª, a resilient sheet metal plate 22ᵇ folded about and screwed to the link 15ᵇ with its opposed side portions embracing the link 14ᵇ. By using longitudinal rather than transverse grooves and ribs, however, I am able to define three positions of adjustment with only two instead of three grooves as before. In the construction shown in Figs. 8 and 9 two longitudinal grooves 32 are fashioned in the link 14ᵇ and a longitudinal rib 33 in the gripper plate 22ᵇ. Thus when the linkage is in either of its two extreme positions the links 14ᵇ, 15ᵇ abut edge to edge and the rib 33 is seated in the upper (as viewed in Figs. 8 and 9) of the grooves 32. But when the linkage is in its midway position, with the links spread apart a maximum distance, the rib 33 is seated in the other or lower groove 32 (see dot-dash line position in Fig. 9).

I claim as my invention:

1. In a swinging arm support, the combination with a parallelogram type of linkage including two elongated parallel links of bar form presenting flat side faces, of means including two portions of resilient sheet metal overlying the respective opposite flat side faces of said links throughout a major portion of the latter's length and engaging the same for releasably holding the links in adjusted positions of endwise displacement relative to each other.

2. In an adjustable support of the type described, the combination with a parallelogram type of linkage including two elongated side-by-side links, of means resiliently and frictionally engaging at least one of said links substantially throughout the latter's length for yieldably restraining said links against movement relative to each other, and means for limiting endwise displacement of said first mentioned means relative to the links.

3. In a swinging arm support, the combination of a parallelogram type of linkage including two elongated parallel links and means pivotally interconnecting them at their opposite ends to move into abutting side-by-side relationship at the respective extremities of swinging movement of linkage, each of said links having an elongated notch in the side thereof opposed to the other and said notches being located for overlapping of their opposite end portions when the linkage is in respective ones of its extremities of movement, gripper means including a pair of opposed members located on opposite sides of said pair of links, and means passing through said notches for drawing said members toward each other into frictional engagement with both of said links.

4. In a swinging arm support, the combination of a parallelogram type of linkage including two links arranged side-by-side and of bar form presenting flat side faces and means pivotally interconnecting them at their opposite ends to move into abutting edge-to-edge relationship at the respective extremities of swinging movement of the linkage, each of said links having an elongated notch in the edge thereof opposed to the other, said notches being located for overlapping of their opposite end portions when the linkage is in respective ones of its extremities of movement, a pair of opposed resilient sheet metal gripper plates engaging opposite side faces of both of said links, and means passing through said notches for drawing said plates toward each other into frictional engagement with said links, each of said plates engaging each of said links substantially throughout the length of the latter.

5. In a swinging arm support, the combination of a parallelogram type of linkage including two elongated parallel links of bar form presenting flat side faces, a gripper plate in the form of a portion of resilient sheet metal doubled upon itself and embracing the links, said gripper plate being fixed to one of said links while frictionally engaging the side faces of the other, and mating ribs and grooves on the engaging portions of said other link and gripper plate for releasably holding said links against relative movement when in predetermined positions of adjustment relative to each other.

6. In a swinging arm support, the combination of a parallelogram type of linkage including two elongated parallel links, a resilient sheet metal plate fixed to one of said links and overlying a side of the other and pressed against the same to frictionally engage it, the engaging portions of said other link and plate having mating ribs and grooves thereon transverse to the links for releasably holding the links against relative longitudinal movement in corresponding predetermined positions of linkage adjustment.

7. In a swinging arm support, the combination of a parallelogram type of linkage including two elongated parallel links of bar form presenting flat side faces, a gripper comprising two portions of resilient sheet metal disposed on opposite sides of the links and fixed to one of said links, one of said portions of sheet metal being arranged frictionally to engage the other link substantially throughout the latter's length, the other portion of sheet metal and said other link having longitudinally extending mating ribs and grooves thereon for releasably holding the links against relative lateral movement in corresponding predetermined positions of linkage adjustment.

8. In a swinging arm support, the combination of a parallelogram type of linkage including two elongated parallel links, a member fixed to one of said links and arranged to overlie a portion of the other, and the overlying portions of said other link and said member having engaging elements thereon extending longitudinally of said other link for releasably holding the links against relative lateral movement in corresponding predetermined positions of linkage adjustment.

RUDOLPH G. BIRR.